United States Patent [19]

Koshii et al.

[11] Patent Number: 4,492,775

[45] Date of Patent: Jan. 8, 1985

[54] ORGANOPOLYSILOXANE FOAM COMPOSITION

[75] Inventors: Taro Koshii, Chiba; Mitsugu Yamashita, Ichihara, both of Japan

[73] Assignee: Toray Silicone Co., Ltd., Tokyo, Japan

[21] Appl. No.: 612,773

[22] Filed: May 22, 1984

[30] Foreign Application Priority Data

Jun. 7, 1983 [JP] Japan .................. 58-101150

[51] Int. Cl.³ .............................................. C08J 9/02
[52] U.S. Cl. ........................................ 521/77; 521/82; 521/88; 521/91; 521/92; 521/93; 521/99; 521/117; 521/122; 521/125; 521/134; 521/154; 528/15; 528/31; 528/32
[58] Field of Search ........... 528/15, 31, 32; 521/77, 521/82, 88, 91, 92, 93, 99, 117, 122, 125, 134, 154

[56] References Cited

U.S. PATENT DOCUMENTS

| | | | |
|---|---|---|---|
| 3,070,555 | 12/1962 | Bruner, Jr. | 521/154 |
| 3,079,349 | 2/1963 | Weyer | 521/154 |
| 3,425,967 | 2/1969 | Modic | 521/154 |
| 3,428,580 | 2/1969 | Nitzsche et al. | 521/154 |
| 3,923,705 | 12/1975 | Smith | 521/154 |

FOREIGN PATENT DOCUMENTS 23462 5/1981 Japan .

*Primary Examiner*—Morton Foelak
*Attorney, Agent, or Firm*—Robert Spector

[57] ABSTRACT

The flowability of foamable compositions comprising a hydroxyl-containing polyorganosiloxane, a polyorganosiloxane containing silicon-bonded hydrogen atoms, a platinum catalyst and a catalyst inhibitor is eliminated by including in the composition a solid filler exhibiting a mean particle size of one micron or less and either (1) organosilicon compound containing at least 0.5% by weight of carboxyl groups or silicon-bonded hydroxyalkyl groups, or (2) a partially esterified polyfunctional alcohol. In addition, the pot life of the composition is increased without adversely affecting the structure of the cured foam or the adhesion of the foam to various substrates.

11 Claims, No Drawings

ORGANOPOLYSILOXANE FOAM COMPOSITION

BACKGROUND OF THE INVENTION

This invention relates to foamable polyorganosiloxane compositions. More particularly, this invention relates to foamable polyorganosiloxane compositions that are nonflowable and nonslumping, have long pot life and produce homogeneous cured foams of excellent quality.

With regard to foaming mechanism, conventional silicone rubber foams more or less fall into two categories. The first category, described in U.S. Pat. No. 3,425,967, which issued to Modic on Feb. 4, 1969, comprises a conventional silicone rubber composition to which a conventional thermally activated blowing agent has been added. The heat produced during curing causes decomposition of the blowing agent to yield the gaseous products responsible for foam formation. The drawback of this mechanism is in the low blow ratio.

The second category of foaming mechanisms, represented by U.S. Pat. No. 3,428,580, which issued to Nitzsche et al. on Feb. 18, 1969, and U.S. Pat. No. 3,070,555, which issued to Bruner, Jr. on Dec. 25, 1962, contains no blowing agent. The curing mechanism itself is responsible for the foaming process, that is, the curing reaction produces low-boiling by-products which cause foaming. The curing and foaming mechanism involves the evolution of hydrogen by the reaction of silanol groups with silicon-bonded hydrogen atoms. The catalysts of Nitzsche et al. are ammonium salts, while Bruner, Jr. employs heavy metal carboxylates such as stannous 2-ethylexoate for this purpose. Both types of catalysts have disadvantages such as toxicity, undesirable odor, short working time (pot life) and the possibility of depolymerization at high temperatures.

Japanese Examined specification No. 81/23462, published on Oct. 18, 1974 as Kokai No. 51/46352, discloses compositions similar to those of Nitzsche et al., but which also contain thermally activated blowing agents as taught in the Modic patent discussed hereinabove.

The compositions disclosed in the patents to Nitzsche et al. and Bruner, Jr. also contain relatively low molecular weight hydroxyl compounds.

U.S. Pat. No. 3,923,705, which issued to Smith on Dec. 2, 1975, discloses foamable compositions containing an organohydrogensiloxane, a hydroxylated organosiloxane and a platinum catalyst. With the use of platinum or platinum compounds as the catalyst, the silicone rubber foam will not have the aforementioned disadvantages resulting from the use of quaternary ammonium salts or heavy metal carboxylates as the reaction catalyst. Additionally, a flame retardant silicone rubber foam can be obtained. Finely divided fillers such as fume silica and carbon black are disclosed as optional ingredients together with relatively low molecular weight hydroxyl endblocked polyorganosiloxanes exhibiting a viscosity of from 0.002 to 0.2 Pa·s at 25° C. Some of the compositions disclosed by Smith are sufficiently flowable prior to the foaming reaction that is necessary to use ceramic board or some other material to retain these compositions when they are used as sealing materials for walls or floor penetrating elements to utilize their fire retardancy. Without such retaining means the foamable compositions might flow away prior to foaming, a serious drawback. It would be desirable to provide a composition that can produce a homogeneous foamed-in-place silicone elastomer foam without using any retaining means.

The prior art discloses various additives for extending the pot life of foamable compositions. The aforementioned U.S. patent to Smith discloses adding a small amount of a platinum catalyst retarder such as methylvinylsiloxane cyclics or acetylenic alcohols to a platinum-catalyzed foamable polyorganosiloxane composition to extend its pot life. However, this type of inhibition is limited to only a 10 minute period after the ingredients of some of Smith's compositions are combined at room temperature. Any further extension of the inhibition period adversely affects the homogeneity of the cured foam, causes the bubble size to become too large and significantly reduces the blow ratio. Thus, in order to obtain a homogeneous foam, it is necessary to complete the working of the foamable composition within a short period after the ingredients of the composition have been combined. The combination of a short pot life and the flowability of prior art compositions makes precise operations difficult.

This invention provides a foamable polyorganosiloxane composition without the foregoing disadvantages. The composition is nonflowing when applied, which eliminates the need for retaining devices, has a long pot life, is nontoxic and not foul smelling. Once foamed and cured, there is no danger of depolymerization at high temperatures. Additionally, the cured foam has superior flame retardancy and is a homogeneous elastomeric product.

DETAILED DESCRIPTION OF THE INVENTION

This invention concerns a foamable polyorganosiloxane composition comprising the product obtained by mixing together, (A) 50–100 parts by weight of a polyorganosiloxane containing at least 2 silicon-bonded hydroxyl groups per molecule, no aliphatically unsaturated hydrocarbon radicals, and exhibiting a viscosity of from 1 to 1000 Pa·s at 25° C.; (B) 0.1–50 parts by weight of a polyorganohydrogensiloxane containing at least 2 silicon-bonded hydrogen atoms per molecule, no aliphatically unsaturated hydrocarbon radicals, and exhibiting a viscosity of from 0.001 to 1,000 Pa·s at 25° C.; (C) a catalytic quantity of a platinum group metal or compound thereof; (D) 0.1–10 parts by weight per 100 parts of combined weight of (A) and (B) of a material containing at least 0.5 weight % of either hydroxyl or carboxyl groups and selected from the group consisting of (a) polyorganosiloxanes exhibiting a viscosity of at most 1 Pa·s at 25° C. and represented by the average unit formula

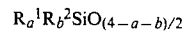

where $R^1$ is a monovalent hydrocarbon radical; $R^2$ is $-R^3OH$ or $-R^3COOH$ where $R^3$ is a divalent hydrocarbon radical, a is from 0 to 3, inclusive, b is greater than 0 but not more than 3, and the sum of a and b is greater than 0 but not more than 3; (b) the partial esters of saturated aliphatic divalent- and trivalent alcohols and the partial esters of polyalkylene glycols and copolymers thereof; (E) 1–150 parts by weight per 100 parts of combined weight of (A) and (B) of an inorganic filler with a maximum mean particle size of 1 micron; and (F) 0.001–3 parts by weight per 100 parts by weight of combined weight of (A) and (B) of a retarder for (C).

Ingredient (A) of this invention, a polyorganosiloxane, must contain at least 2 silicon-bonded hydroxyl groups per molecule. The hydroxyl groups may be located at molecular chain terminals, in side chains or at both locations. The silicon-bonded hydrocarbon radicals contain no aliphatic unsaturation. Suitable radicals include alkyl radicals such as methyl, ethyl, propyl and octyl; aryl radicals such as phenyl and substituted alkyl radicals such as 3,3,3-trifluoropropyl.

The molecular configuration of (A) is generally either a linear or branched chain, and can include cyclic and network structures. Moreover, a single type of polyorganosiloxane or mixtures of 2 or more types can be used. The polyorganosiloxane must have a viscosity at 25° C. of from 1 to 1000 Pa·s. At less than 1 Pa·s, the cured foam is fragile. At more than 1000 Pa·s the foamable compositions are difficult to prepare and commercial scale productivity is significantly reduced. The present compositions contain from 50 to 100 parts by weight of (A).

Ingredient (B) of this invention is a polyorganohydrogensiloxane containing at least 2 silicon-bonded hydrogen atoms per molecule. The silicon-bonded hydrogens can be located at terminal positions, in side chains or both. The silicon-bonded hydrocarbon radicals that can be present and the molecular configuration are the same as described hereinabove for (A).

Ingredient (B) has a viscosity at 25° C. of from 0.001 to 1000 Pa·s. At less than 0.001 Pa·s (B) is sufficiently volatile that a substantial amount can evaporate from the foamable composition. At more than 1000 Pa·s the foamable composition is difficult to prepare. From 0.1 to 50, preferably from 1 to 30, parts by weight of (B) are present per 40-100 parts by weight of (A). At below 0.1 part by weight, too little hydrogen is generated, resulting in an inadequate blow ratio. On the other hand, at above 50 parts by weight, a homogeneous foam cannot be obtained.

Ingredient (C) includes platinum group metals and compounds thereof that are known catalysts for the condensation reaction between the hydroxyl groups of (A) and the silicon-bonded hydrogen atoms of (B). Examples of suitable catalysts are platinum powder adsorbed in a carrier such as silica, alumina, or silica gel; platinic chloride; chloroplatinic acid; complexes of chloroplatinic acid hexahydrate with either an olefin or divinyltetramethyldisiloxane; alcoholic solutions of chloroplatinic acid hexahydrate; palladium catalysts; rhodium catalysts; etc. The catalyst is added in a quantity sufficient to catalyze the aforementioned condensation reaction. From 1 to 500 and preferably from 1 to 100 parts by weight of platinum group metal or compound thereof are used per 1,000,000 parts of combined weight of (A) and (B). Less than 1 part by weight is inadequate for catalyzing foaming while more than 500 parts by weight gives no increase in effectiveness and is therefore uneconomical.

The combination of ingredient (D) of this invention, a hydrophilic group-containing compound, and ingredient (E), a finely divided inorganic filler powder, is required to make the foamable composition nonflowable. Neither ingredient alone makes the composition sufficiently nonflowable. The hydrophilic group in (D) may be either hydroxyl or carboxyl. To obtain adequate nonflowability, (D) must contain 0.5 weight % or more of hydroxyl or carboxyl groups.

Ingredient (D) can be divided into 2 categories. One category consists of polyorganosiloxanes which contain carboxyl or hydroxyalkyl groups bonded to silicon, and is identified hereinafter as (D)(a). The category identified as (D)(b) consists of organic compounds containing hydroxyl and esterified hydroxyl groups and no silicon atoms.

Ingredient (D)(a) is a polyorganosiloxane with a viscosity of 1 Pa·s or less at 25° C. and is represented by the average unit formula

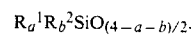

$R^1$ is a monovalent hydrocarbon radical of the type described hereinbefore in connection with (A); $R^2$ is selected from the group consisting of —$R^3$OH and —$R^3$COOH where $R^3$ is a divalent hydrocarbon radical; the value of a is from 0 to 3, inclusive; the value of b is greater than 0 but does not exceed 3; and the sum of a and b is greater than 0 but does not exceed 3. $R^2$ is preferably selected from the group consisting of

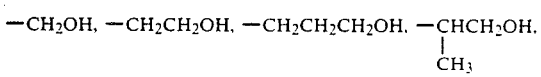

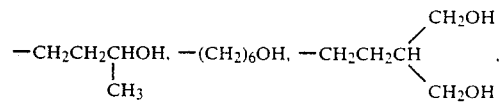

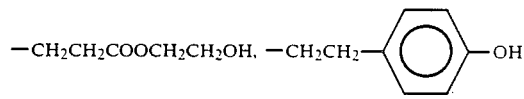

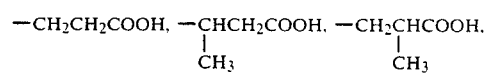

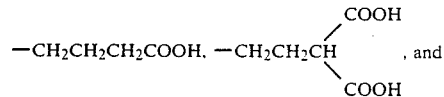

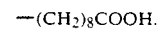

The molecular configuration of (D)(a) can be linear, branched or cyclic. It is preferably linear and contains less than 100 repeating siloxane units. There is no specific restriction on the position of the hydrophilic groups, which can be at the terminal positions, in side chains or at both locations.

Ingredient (D)(b) can be a partially esterified saturated aliphatic divalent or trivalent alcohol, a partially esterified polyalkylene glycol, or a partially esterified copolymer derived from an alkylene glycol and a copolymerizable monomer. Examples of saturated aliphatic alcohols that can be partially esterified are ethylene glycol, propylene glycol, 1,2-butanediol, 2,3-pentanediol, glycerol and 1,2,3-butanetriol. Examples of polyalkylene glycols that can be partially esterified are polyethylene glycol, polypropylene glycol, polybutylene glycol and block or graft copolymers of alkylene glycols and copolymerizable monomers.

From 0.1 to 10 parts by weight and preferably from 0.5 to 5 parts by weight of one or more hydrophilic group-containing compounds chosen from among (D)(a) and (D)(b) are added per 100 parts by weight of the total components (A) plus (B). Less than 0.1 part by weight will not impart adequate nonflowability while more than 10 parts by weight will adversely affect the foam's properties.

An inorganic filler powder, (E), with a mean particle size below 1 micron, is the other ingredient required to make the present compositions nonflowable. The reason for specifying a mean particle size below 1 micron is that the resultant high surface area allows for a reaction of (E) with (D) in order to impart nonflowability to the present compositions. The use of an inorganic filler with a larger mean particle size is less effective in imparting nonflowability. From 1 to 150 and preferably from 1 to 100 parts by weight inorganic filler powder are required per 100 parts of combined weight of (A) and (B). Less than 1 part by weight of (E) imparts inadequate nonflowability. More than 150 parts by weight of (E) increases the viscosity to the extent that a commercial scale foaming process becomes difficult. As long as the mean particle size is below 1 micron, any inorganic filler powder is acceptable. For example, fumed silica, wet-process silica, calcium carbonate powder, alumina powder, powdered aluminum hydroxide, carbon black, and mixtures of 2 or more of these fillers can be used as (E).

Ingredient (F), a platinum catalyst retarder, extends the pot life, i.e., time interval between mixing together of all ingredients and foaming and curing of the composition, thereby facilitating installation of the foam at the desired location.

Any available retarder for the catalyst (C) can be used, including organonitrogen compounds, tin compounds, cyclic methylvinylsiloxanes and acetylenic alcohols. As mentioned hereinbefore, the addition of this retarder ensures an adequate pot life. When only (F) is added, as taught by the prior art, extending the pot life to more than 10 minutes will yield a nonhomogeneous foam. In the present compositions, the combination of (D), (E) and (F) allows the pot life to be extended without adversely affecting the foam. Pot life can be greatly extended in comparison prior art compositions containing only component (F). Only a relatively small quantity of (F) is required to delay the initiation of foaming and curing after mixing the composition of this invention. From 0.001 to 3 parts by weight of (F) per 100 parts by weight, based on the combined weight of (A) and (B) is sufficient. Less than 0.001 part will not provide an adequate pot life while more than 3 parts by weight will adversely affect the properties of the cured foam.

In addition to the foregoing ingredients (A) through (F) a vinyl group-containing polyorganosiloxane can be added to the present compositions to strengthen the foam. Conventional additives, including extender fillers, pigments, thermal stabilizers, flame retardants and organic solvents can also be present. For example, in addition to filler (E) other fillers with a mean particle size above 1 micron may also be present, such as diatomaceous earth, zinc dioxide, titanium dioxide, calcium silicate, zirconia silicate, talc and clay.

The present compositions can be used in the same manner as previously known foamable compositions. Due to their nonflowability, they are particularly suitable for sealing floors, wall-penetrating holes and other areas which present problems for flowable compositions.

The following examples demonstrate preferred compositions of this invention and provide comparisons with similar prior art foamable compositions which do not contain the combination of ingredients (D) and (E).

"Parts" in the Examples and Comparison Examples denotes parts by weight. Viscosities were measured at 25° C.

EXAMPLE 1

100 parts of an $\alpha,\omega$-dihydroxypolydimethylsiloxane with a viscosity of 2.5 Pa·s, 10 parts of a trimethylsiloxy endblocked polymethylhydrogensiloxane with a viscosity of 0.030 Pa·s and which contains 1.5 weight % silicon-bonded hydrogen atoms, 4 parts of a fumed silica with a mean particle size of 0.01 micron and a surface area of 200 $m^2/g$ and 4 parts of one of the compounds listed in Table 1 were combined and mixed to homogeneity. 0.4 part methylvinylsiloxane cyclic tetramer and 0.4 part of a complex derived from reacting chloroplatinic acid hexahydrate, ethanol and divinyltetramethyldisiloxane were added to each composition and the resultant compositions were mixed to homogeneity. Each of the compositions were then placed in a 5 cm. diameter cylindrical paper cup and its pot life (measured from the beginning of mixing the complete composition until the beginning of thickening and foaming) was determined, in addition to the blow ratio and cell structure of the cured foam. The pot life and blow ratio values for each of the foams are recorded in Table 1. All of the foams exhibited a good, fine cell structure. Immediately after mixing, a 1 cm.-thick layer of each composition was applied to a vertical mortar surface. The foaming process was watched and no slump (run-down) was observed.

Each of the foregoing compositions were also applied to silane primer-coated aluminum, copper and glass panels and to a mortar panel coated with an acrylurethane primer. After foaming and curing, coatings all exhibited firm adhesion.

COMPARISON EXAMPLE 1

A foamable polyorganosiloxane composition was prepared as described in Example 1, except for the omission of the fumed silica and ingredient (D). This composition was quite flowable. The pot life was 21 minutes and the cured foam had a blow ratio of 1.2, was coarse and lacked fineness.

This polyorganosiloxane composition was applied to the silane primer-coated aluminum, copper and glass panels and mortar panel coated with acrylurethane primer. In every case, there was no adhesion after foaming and curing.

COMPARISON EXAMPLE 2

A foamable polyorganosiloxane composition was produced as described in Example 1, except for the omission of ingredient (D). This composition was flowable. The pot life was 19 minutes and the blow ratio of the cured foam was 1.2. The cells were large and lacked fineness.

The same adhesion experiments described in Example 1 were carried out using this polyorganosiloxane composition. None of the cured coatings adhered to the substrate.

TABLE 1

| Ingredient (D) | Pot Life (Min.) | Blow Ratio | Foam Appearance | Slump |
|---|---|---|---|---|
| 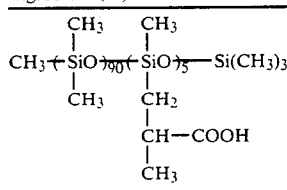<br>(Viscosity: 0.25 Pa·s) | 25 | 2.1 | Good | None |
| 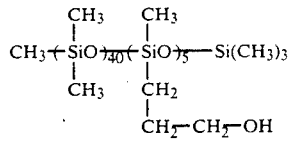<br>(Viscosity: 0.07 Pa·s) | 22 | 2.2 | Good | None |
| 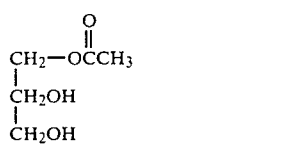 | 21 | 2.5 | Good | None |

COMPARISON EXAMPLE 3

A foamable composition was prepared as described in Example 1 except for omitting the 4 parts of fumed silica and ingredient (D) and including 4 parts of an α,ω-dihydroxypolydimethylsiloxane exhibiting a viscosity of 0.040 Pa·s and a hydroxyl content of 7 weight percent.

This composition was flowable, the pot life was 20 minutes, the blow ratio of the cured foam was 1.3 and the cells were relatively large and lacked fineness.

The compositions were evaluated using the panel adhesion experiment described in Example 1. All of the cured foams exhibited almost no adhesion.

COMPARISON EXAMPLE 4

100 parts of an α,ω-dihydroxypolydimethylsiloxane with a viscosity of 5 Pa·s, 4 parts of a trimethylsiloxy endblocked dimethylsiloxane-methylhydrogensiloxane copolymer containing 0.75 weight % silicon-bonded hydrogen atoms and exhibiting a viscosity of 0.01 Pa·s, 16 parts trimethylsiloxy endblocked polymethylhydrogensiloxane containing 1.5 weight % silicon-bonded hydrogen atoms and exhibiting a viscosity of 0.03 Pa·s, 10 parts of a vinyldimethylsiloxy endblocked polydimethylsiloxane exhibiting a viscosity of 2 Pa·s, 80 parts of coarse aluminum hydroxide powder with a mean particle size of 50 microns and 3 parts of a polymethylphenylsiloxane containing 3 weight % silicon-bonded hydroxyl groups and exhibiting a viscosity of 0.50 Pa·s were combined and mixed to homogeneity. To this were added 0.6 parts methylvinylsiloxane cyclic tetramer and 0.4 parts of a complex derived from chloroplatinic acid hexahydrate, ethanol and divinyltetramethyldisiloxane. The resultant foamable composition was evaluated as described in Example 1.

The pot life was 30 minutes and the composition was essentially flowable. The cured foam had a blow ratio of 1.4 and lacked the fine structure of the foams disclosed in the preceding Example 1. The adhesion of the cured foam to aluminum, copper, glass and mortar panels was poor relative to the foams described in Example 1.

That which is claimed is:

1. A foamable polyorganosiloxane composition comprising the product obtained by mixing together:
   (A) 50-100 parts by weight of a polyorganosiloxane substantially free of silicon bonded hydroxyl groups, containing at least 2 silicon-bonded hydroxyl groups per molecule, no aliphatically unsaturated hydrocarbon radicals, and exhibiting a viscosity of from 1 to 1000 Pa·s at 25° C.;
   (B) 0.1-50 parts by weight of a polyorganohydrogensiloxane containing at least two silicon-bonded hydrogen atoms per molecule, no aliphatically unsaturated hydrocarbon radicals, and exhibiting a viscosity of from 0.001 to 1000 Pa·s at 25° C.;
   (C) a catalytic quantity of a platinum group metal or compound thereof;
   (D) 0.1-10 parts by weight per 100 parts of combined weight of (A) and (B) of a material containing at least 0.5 weight % of either hydroxyl or carboxyl groups and selected from the group consisting of (a) polyorganosiloxanes exhibiting a viscosity of at most 1 Pa·s at 25° C. and represented by the average unit formula $$R_a^1 R_b^2 SiO_{(4-a-b)/2}$$

where $R^1$ is a monovalent hydrocarbon radical; $R^2$ is $-R^3OH$ or $-R^3COOH$ where $R^3$ is a monovalent hydrocarbon radical, a is from 0 to 3, inclusive, b is greater than 0 but not more than 3, and the sum of a and b is greater than 0 but not more than 3; (b) the partial esters of saturated aliphatic divalent- and trivalent alcohols and the partial esters of polyalkylene glycols and copolymers thereof;
   (E) 1-150 parts by weight per 100 parts of combined weight of (A) and (B) of an inorganic filler with a maximum mean particle size of 1 micron; and
   (F) 0.001-3 parts by weight per 100 parts by weight of combined weight of (A) and (B) of a retarder for (C).

2. A composition according to claim 1 where (A) is a hydroxyl endblocked polydimethylsiloxane.

3. A composition according to claim 1 where (B) is a trimethylsiloxy endblocked polymethylhydrogensiloxane or a dimethylsiloxanemethylhydrogensiloxane copolymer.

4. A composition according to claim 1 where the concentration of (B) is from 1 to 30 parts by weight.

5. A composition according to claim 1 where (C) is platinum powder, platinic chloride, chloroplatinic acid or a complex obtained by reacting chloroplatinic acid hexahydrate, ethanol and divinyltetramethyldisiloxane.

6. A composition according to claim 1 where from 1 to 500 parts by weight of (C) are present per million parts of combined weight of (A) and (B).

7. A composition according to claim 7 where from 1 to 100 parts by weight of (C) are present per million parts of combined weight of (A) and (B).

8. A composition according to claim 1 where (D) is a polyorganosiloxane wherein $R^2$ is selected from the group consisting of

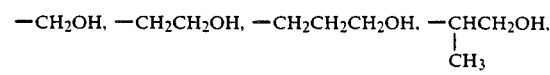

-continued

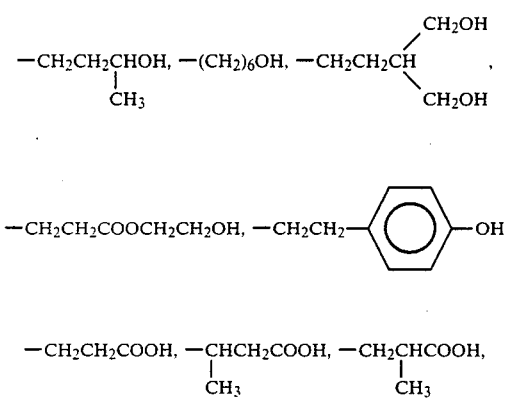

-continued

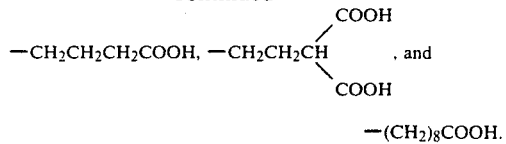

$-(CH_2)_8COOH.$

9. A composition according to claim 1 where (E) is at least one member selected from the group consisting of fume silica, wet process silica, calcium carbonate powder, alumina powder, powdered aluminum hydroxide and carbon black.

10. A composition according to claim 1 where (F) is selected from the group consisting of organonitrogen compounds, tin compounds, cyclic methylvinylsiloxanes and acetylenic alcohols.

11. A composition according to claim 1 where said composition includes a polyorganosiloxane containing at least one vinyl radical per molecule.

* * * * *

UNITED STATES PATENT AND TRADEMARK OFFICE
CERTIFICATE OF CORRECTION

PATENT NO. : 4,492,775

DATED : January 8, 1985

INVENTOR(S) : Taro Koshii and Mitsugu Yamashita

It is certified that error appears in the above-identified patent and that said Letters Patent is hereby corrected as shown below:

Column 8, lines 31-32 - Delete "monovalent" and substitute therefor --- divalent --- .

Signed and Sealed this

Twenty-fourth Day of September 1985

[SEAL]

Attest:

DONALD J. QUIGG

Attesting Officer

Commissioner of Patents and Trademarks—Designate